United States Patent
Wang et al.

(10) Patent No.: US 12,164,675 B2
(45) Date of Patent: Dec. 10, 2024

(54) CAPABILITY MANAGEMENT METHOD AND COMPUTER DEVICE

(71) Applicant: HUAWEI TECHNOLOGIES CO., LTD., Shenzhen (CN)

(72) Inventors: Nan Wang, Beijing (CN); Zipeng Zhang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 473 days.

(21) Appl. No.: 17/734,187

(22) Filed: May 2, 2022

(65) Prior Publication Data

US 2022/0261489 A1 Aug. 18, 2022

Related U.S. Application Data

(63) Continuation of application No. PCT/CN2020/125765, filed on Nov. 2, 2020.

(30) Foreign Application Priority Data

Nov. 8, 2019 (CN) .......................... 201911088881.6

(51) Int. Cl.
*G06F 9/54* (2006.01)
*G06F 9/46* (2006.01)
*G06F 21/62* (2013.01)

(52) U.S. Cl.
CPC .......... *G06F 21/629* (2013.01); *G06F 9/468* (2013.01); *G06F 9/545* (2013.01)

(58) Field of Classification Search
None
See application file for complete search history.

(56) References Cited

U.S. PATENT DOCUMENTS

2005/0091658 A1 4/2005 Kavalam et al.
2019/0278934 A1 9/2019 Bhuiyan et al.
(Continued)

FOREIGN PATENT DOCUMENTS

CN 102244682 A 11/2011
CN 103297441 A 9/2013
(Continued)

OTHER PUBLICATIONS

Hille et al., "SemperOS: a Distributed Capability System", Proceedings of the 2019 USENIX Conference on Usenix Annual Technical Conference, Jul. 10, 2019, 14 pages.
(Continued)

*Primary Examiner* — Craig C Dorais
(74) *Attorney, Agent, or Firm* — Maier & Maier, PLLC

(57) ABSTRACT

A capability management method and apparatus, a computer device, and the like relate to permission management of a kernel object in an operating system, for example, permission management of a kernel object in a microkernel architecture. In the method, two types of information are stored in a capability node of a capability owner: information used to indicate that a capability is granting and information used to indicate a granted capability. A capability association relationship between a grantor and a grantee is established by recording the two types of information, so that capability copying is avoided in a capability granting procedure, and capability deletion is avoided in a procedure of rejecting a capability by the grantee, thereby ensuring a deterministic latency while implementing capability revocation and granting. The method may be applied to a smartphone system, an unmanned driving system, or the like.

12 Claims, 8 Drawing Sheets

(56) References Cited

U.S. PATENT DOCUMENTS

| | | | |
|---|---|---|---|
| 2019/0286795 A1 | 9/2019 | Bhatt | |
| 2020/0218816 A1* | 7/2020 | Yang | G06F 21/629 |
| 2021/0243198 A1* | 8/2021 | Naumann Zu Koenigsbrueck | H04W 12/08 |

FOREIGN PATENT DOCUMENTS

| | | |
|---|---|---|
| CN | 103620616 A | 3/2014 |
| CN | 104063303 A | 9/2014 |
| CN | 104410615 A | 3/2015 |
| CN | 108881354 A | 11/2018 |
| CN | 108900484 A | 11/2018 |
| CN | 109033861 A | 12/2018 |
| CN | 109450953 A | 3/2019 |
| CN | 109462545 A | 3/2019 |
| CN | 109740310 A | 5/2019 |
| CN | 109951473 A | 6/2019 |
| KR | 1020120043377 A | 5/2012 |
| KR | 1020130119862 A | 11/2013 |
| WO | 2018165983 A1 | 9/2018 |

OTHER PUBLICATIONS

Pohle et al., "Capability Wrangling Made Easy: Debugging on a Microkernel with Valgrind", Proceedings of the 6th International Conference on Virtual Execution Environments, VEE 2010, Pittsburgh, Pennsylvania, USA, Mar. 17-19, 2010, 10 pages.

Elkaduwe et al., "Verified Protection Model of the sel4 Microkernel", VSTTE 2008: Verified Software: Theories, Tools, Experiments, 16 pages.

Gligor, "Review and Revocation of Access Privileges Distributed Through Capabilities", IEEE Transactions on Software Engineering, Nov. 1979, vol. SE-5, No. 6, pp. 575-586.

* cited by examiner

CAPABILITY MANAGEMENT METHOD AND COMPUTER DEVICE

CROSS-REFERENCE TO RELATED APPLICATIONS

This application is a continuation of International Application No. PCT/CN2020/125765, filed on Nov. 2, 2020, which claims priority to Chinese Patent Application No. 201911088881.6, filed on Nov. 8, 2019. The disclosures of the aforementioned applications are hereby incorporated by reference in their entireties.

TECHNICAL FIELD

The embodiments relate to computer technologies, and in particular, to a capability management method and apparatus, a computer device, and the like.

BACKGROUND

A microkernel-based operating system architecture (referred to as a microkernel architecture) may be applied to various scenarios such as a cloud platform, an embedded device, a mobile device, assisted driving, and unmanned driving. The microkernel architecture enables many components such as a file system and a network protocol stack in a conventional operating system kernel (such as a microkernel architecture Linux) to run in a user mode process and enables a quantity of real kernel functions of the microkernel architecture to be reduced to a very small quantity. The microkernel architecture includes the user mode process and a kernel. The user mode process is a process running in a user mode. The kernel is responsible for managing a critical resource and providing a service such as interprocess communication, a page table, or interrupt control for the user mode process. The user mode process requests a service from the kernel through a system call. Because a kernel resource and service are critical and access security needs to be ensured, provision of the kernel resource or service needs to be constrained by using a security management mechanism.

The kernel uses a kernel object to abstract a resource or service provided by the kernel. A capability-based security mechanism (hereinafter referred to as a capability mechanism) is generally used in current microkernel architectures to control access of a user mode process to a kernel object. The user mode process sends a request to the kernel by using a system call, to request to access the kernel object. The capability mechanism first performs permission check on the request, and only after the permission check succeeds, the kernel starts to respond to the request.

A basic concept in the capability mechanism is capability. The capability is a non-forged permission tag that records an identifier (such as a number or memory address) of a kernel object and a permission to access to the kernel object. The permission check in the capability mechanism means that if a user mode process (hereinafter referred to as a process) wants to access a kernel object, the kernel needs to check whether the process obtains a capability of the kernel object. If the process obtains the capability of the kernel object, the process can access the kernel object based on a permission recorded in the capability. Otherwise, the process cannot access the kernel object. If one process can obtain a plurality of different capabilities, it indicates that the process can access a plurality of different kernel objects. All capabilities obtained by one process are placed in one data structure. The data structure is referred to as a capability node. Further, a process can share, with another process, a kernel object that the process has a permission to access. This is capability granting. In addition, the process can also cancel, at any time, a permission of the process or another process to access the kernel object. This is capability revocation.

To resolve capability granting and revocation, capability copying and deletion mechanisms are usually used in the industry. If a process A (also referred to as a grantor) needs to share a kernel object O with a process B (also referred to as a grantee), the process A copies a capability C of the kernel object in a capability node of the process A to a capability node of the process B. In this way, the process B can access the kernel object O. The process B can further continue sharing. In addition, in a capability copying procedure, a quantity of permissions in a capability can be reduced. The capability copying may also be referred to as a derivation.

There are two capability revocation cases. In one case, a grantor actively revokes a granting capability. In the other case, a grantee rejects a capability. To complete capability revocation, a previous derivation relationship, that is, a capability C1 derives from a capability C and a capability C2 derives from the capability C1, needs to be recorded. A data structure that records this derivation relationship is referred to as a capability derivation tree. When a grantor revokes a grant of a capability, all capabilities derived from the capability need to be deleted. When a grantee actively rejects a grant of a capability, the capability in a capability node of the grantee needs to be deleted.

The conventional technology can implement capability granting and revocation but cannot ensure a deterministic latency. Due to capability copying, a plurality of capabilities may point to a same kernel object. Therefore, when a grantee actively rejects a grant of a capability, there may be two cases: 1. When the capability is not the last capability that points to a kernel object included in the capability, only the capability needs to be deleted from a capability node. 2. When the capability is the last capability that points to the kernel object, both the capability and the kernel object need to be deleted. Otherwise, a memory leak is caused because there is no other manner for accessing the kernel object. Because different time is consumed in the foregoing different cases, this poses a great challenge to deterministic latency analysis.

SUMMARY

A capability management method can ensure a deterministic latency in capability rejection. A data structure, an apparatus, a computer program product (for example, an operating system), a storage medium, a computer device, and the like may implement the method.

It should be noted that the capability management method may also be referred to as a permission management method, a kernel object management method, a capability-based kernel object management method, a capability revocation method, or the like.

First, possible concepts are introduced.

Operating system: The operating system is system software that manages computer hardware and software resources and is also a basis of a computer system. The operating system needs to handle basic transactions, for example, manage and configure memory, determine a priority of a system resource supply and demand, control input and output devices, operate a network, and manage a file system. The operating system may further provide an operating interface for a user to interact with the system.

Kernel: The kernel is a program configured to manage data input and output requirements sent by software. The kernel translates these requirements into data processing instructions and sends the data processing instructions to a central processing unit (CPU) and another electronic component in a computer for processing. The kernel is a basic part of a modern operating system.

Kernel object: The kernel object is an abstraction of information managed by a kernel and represents various types of information maintained by the kernel, such as a thread control block, a process page table, and a process communication channel. As a data structure, the kernel object is stored in a memory block allocated by the kernel. The kernel object is directly accessed by the kernel. The kernel provides an interface to allow a user mode process to access the kernel object and uses a permission control mechanism to manage access of the user mode process to the kernel object. It should be noted that the user mode process indirectly accesses the kernel object, that is, the user mode process invokes the interface and then enters the kernel, so that the kernel directly accesses the kernel object.

Capability: The capability is used to represent an access permission for a kernel object. The capability usually records two pieces of information: an identifier of the kernel object and the access permission for the kernel object. The kernel object in the capability is a kernel object to which the capability points (or refers). In other words, the capability represents the access permission for the kernel object. The identifier of the kernel object may be a memory address or number of the kernel object. The access permission may be read-only, read/write, or the like. A kernel manages access of a user mode process to the kernel object by using a capability-based security mechanism. Only after obtaining a capability, a process can access a kernel object indicated by the capability, and the process needs to access the kernel object based on a permission indicated by the capability. The capability is usually used in an existing microkernel system.

Capability node: The capability node is a data structure configured to store all capabilities obtained by one process. The capability node is also a kernel object. In a microkernel architecture such as an L4 microkernel architecture, the capability node is named CNode. All capability nodes are stored in capability space (CSpace).

Capability granting (or referred to as capability sharing): A capability owned by a process A can be shared with a process B, so that the process B can access a kernel object indicated by the capability. The capability granting may also be referred to as kernel object granting. The process A may be referred to as a grantor, and the process B is referred to as a grantee. Capability granting in the conventional technology is implemented through capability copying (or referred to as derivation). It should be understood that both the process A and the process B herein are usually user mode processes. In a capability copying procedure, a permission can be modified. For example, the process A can selectively grant only some permissions to the process B.

Revocation of a capability (or referred to as revocation of a grant): a process A revokes a capability granted to a process B; in other words, does not share a kernel object indicated by the capability.

Rejection of a capability (or rejection of a grant): A process B rejects a capability granted by a process A to the process B. The revocation of a capability and the rejection of a capability may also be collectively referred to as capability revocation and are considered as two different statuses of the capability revocation.

The following describes a plurality of aspects that may be separately implemented. Any two or more of the plurality of aspects may be selected for joint implementation. Mutual references may be made to implementations and beneficial effects of the following plurality of aspects.

According to a first aspect, a capability management data structure includes a capability and grant information of the capability. The capability includes an identifier of a kernel object and an access permission for the kernel object. The grant information of the capability includes first information used to indicate a granted capability and second information used to indicate a granting capability. Neither the first information nor the second information is a capability.

In some implementations, the first information is used to search a capability node of an owner of the granted capability for the granted capability. The granted capability is stored only in the capability node of the owner.

In some implementations, the second information is used to search, for the granting capability, a capability node including the second information. In some implementations, the second information further includes a granting permission, and the permission is some or all permissions of the granting capability.

In some implementations, the second information is further used to indicate a grantee of the granting capability.

In some implementations, the data structure may be stored as a kernel object in storage space corresponding to a kernel. The data structure may be a capability node. The kernel may be a microkernel.

In some implementations, the data structure may not include the first information. For example, the data structure exists in a capability node of a grantor, or the data structure is the capability node of the grantor. In some implementations, the data structure may not include the second information. For example, the data structure exists in a capability node of a grantee, or the data structure is the capability node of the grantee.

It should be understood that the grantor and the grantee are relative roles, and the two roles are interchangeable.

In some implementations, the first information and the second information each may be an identifier of a capability, or an identifier of a container (such as a slot) storing the capability (which may also be understood as a storage address of the capability), or the like. The first information and the second information each are used to find a corresponding capability, but the first information and the second information each are not the capability.

The first information and the second information may be respectively M1 and M2 in FIG. 2, or the first information and the second information may be respectively M1 and M2 in FIG. 3.

The first information may be information 1 in a CNode B or a CNode C in FIG. 4, and the second information may be information 1 or information 2 in a CNode A.

The first information may be an identifier (or referred to as an index) that is of a uslot c and that is stored in an rslot c in FIG. 6, the uslot c can be found by using the identifier, and content stored in the uslot c can be further accessed; and the second information may be an identifier (or referred to as an index) that is of a cap c and that is stored in the uslot c, and the identifier may be used to learn that the cap c is granting. The second information may further include an identifier (or referred to as an index) of the rslot c, and the identifier may be used to learn that the cap c is granted to a process including the rslot c. It should be understood that in this implementation in FIG. 6, deleting the first information or the second information may be implemented as deleting a container, namely, a slot, storing the first information or the second information. There are many identifier or index implementations. FIG. 8 provides an implementation that is not limited.

It may be understood that, unlike the conventional technology in which a capability node of a grantee directly stores a granted capability, this data structure stores the first information to indicate the granted capability; in other words, the granted capability can be found by using the first information. When the grantee rejects the capability, the kernel can directly delete the first information to avoid capability deletion, so that there is no uncertainty about whether a kernel object needs to be deleted, thereby ensuring a deterministic latency.

In addition, this data structure further stores the second information to indicate the granting capability, so that the grantor can directly delete the second information when revoking a granting capability, without a complex algorithm, thereby shortening revocation operation time.

Further, a same capability may be granted to different grantees, and the second information is further used to record a grantee. In this manner, the grantor can revoke a capability of a grantee by using information specifying the grantee, thereby improving revocation operation accuracy.

According to a second aspect, a capability management method may be performed by a kernel. The method may be initiated by a grantee. The method may be considered as a method for rejecting a capability grant by the grantee. The method includes: receiving a reject request sent by the grantee, where the reject request includes a first identifier, the first identifier is used to indicate a to-be-rejected capability, and the to-be-rejected capability is a capability granted by a grantor to the grantee; and deleting first target information that matches the first identifier from a capability node of the grantee, where the to-be-rejected capability is stored only in a capability node of the grantor, and the first target information is used to search the capability node of the grantor for the to-be-rejected capability.

The capability node of the grantee herein uses the data structure described in the foregoing aspect, and the first target information is used to indicate the to-be-rejected capability but is not the to-be-rejected capability.

In some implementations, deleting the first target information may be implemented by deleting a container storing the information, for example, deleting a slot in an embodiment in FIG. 5 or the like.

It may be understood that when the grantee needs to reject a granted capability, the kernel may directly delete information corresponding to the capability in the capability node of the grantee. This does not require capability deletion because the capability is not stored, so that there is no uncertainty about whether a kernel object needs to be deleted, thereby ensuring a deterministic latency.

According to a third aspect, a capability management method may be performed by a kernel. The method may be initiated by a grantor. The method may be considered as a method for revoking a capability by the grantor. The method includes: receiving a revoke request sent by the grantor, where the revoke request includes a second identifier, the second identifier is used to indicate a to-be-revoked capability, and the to-be-revoked capability is a capability granted by the grantor to a grantee; and deleting second target information that matches the second identifier from a capability node of the grantor, where the to-be-revoked capability is stored only in the capability node of the grantor, and the second target information is used to search capabilities of the grantor for the to-be-revoked capability. The second target information is used to indicate that the to-be-revoked capability has been granted.

The capability node of the grantor herein uses the data structure described in the foregoing aspect, and the second target information is used to indicate the to-be-revoked capability but is not the capability.

In some implementations, the second target information may be independent of all the capabilities of the grantor. In some other implementations, the second target information may be used as a label, a suffix, or the like behind the capability. In this case, deleting the second target information may be deleting the label or the suffix.

It may be understood that when the grantor revokes a capability, because the capability is stored only in the capability node of the grantor, unlike the conventional technology in which the kernel needs to perform a capability deletion operation in a capability node of a grantee, the kernel needs to delete only second target information corresponding to the capability from the capability node of the grantor, thereby simplifying a revocation operation and shortening capability revocation duration. It should be noted that the kernel may alternatively perform a deletion operation in the capability node of the grantee based on an actual situation, but the deletion operation does not need to be as complex as capability deletion in the conventional technology.

In some implementations, when the grantor can grant a same capability to different grantees, the second target information stored in the capability node of the grantor indicates both the granting capability and a grantee to which the capability is granted. If the grantor needs to revoke a capability of a grantee (referred to as a target grantee), the second identifier is further used to indicate the target grantee. In this way, a capability granted to a grantee can be accurately revoked, unlike the conventional technology in which capabilities of all grantees are first revoked and then a capability is granted again to a grantee whose capability does not need to be revoked, thereby shortening revocation time.

It should be noted that the first target information may be considered as information that matches a requirement of a requester in a plurality of pieces of first information, and the second target information may be considered as information that matches a requirement of a requester in a plurality of pieces of second information. Therefore, for implementations of the first target information and the second target information, refer to the implementations of the first information and the second information in the first aspect. For details, refer to implementations in FIG. 3, FIG. 4, FIG. 5, and the like. Details are not described herein again.

According to a fourth aspect, a capability management method may be executed by a kernel. The method may be initiated by a grantor or may be initiated by a grantee. It may be considered that the method implements capability granting. The method includes: receiving a grant request sent by the grantor, where the grant request is used to indicate to grant a target capability in a capability node of the grantor, and the target capability is stored only in the capability node of the grantor; recording grant information in the capability node of the grantor, where the grant information is used to indicate that the target capability has been granted; and recording granted information in a capability node of the grantee, where the granted information is used to search the capability node of the grantor for the target capability.

A sequence of recording the granted information and the grant information is not limited. Respectively similar to the first target information and the second target information in the foregoing aspects, the granted information and the grant information in this aspect each are not a capability and may be information used to identify or search for the capability, such as an index of the capability or an index of a storage structure including the capability.

In this granting method, a capability is stored only in capability space of a capability owner, namely, a grantor, and the capability does not need to be copied to capability space of a grantee, so that granting execution time is shortened.

In some implementations, the grant information may be further used to indicate that the target capability is granted to the grantee. In this way, when a same capability is granted to different grantees, there is different grant information. Therefore, when the grantor revokes the capability, grant information that includes a grantee can be pertinently deleted, to implement accurate revocation.

In some implementations, the method further includes: receiving a reject request sent by the grantee, where the reject request includes a first identifier, and the first identifier is used to identify the target capability or identify the granted information; and deleting the granted information from the capability node of the grantee.

When the grantee rejects the target capability, the kernel needs to delete only the granted information without deleting the capability, thereby ensuring a deterministic latency.

In some implementations, the method further includes: receiving a revoke request sent by the grantor, where the revoke request includes a second identifier, and the second identifier is used to identify the target capability or identify the grant information; and deleting the grant information from the capability node of the grantor.

When the grantor revokes the capability, because the capability node of the grantee does not store the capability, without performing a capability deletion operation, the kernel needs to delete only the grant information; in other words, terminate a relationship between the capability and the grantee, thereby shortening revocation duration.

The methods provided in the foregoing aspects are described from a perspective of the kernel, and the following describes a method from a perspective of a user mode process. For a kernel-implemented part in the following aspect, refer to the foregoing aspects.

According to a fifth aspect, a capability management method includes a grantor sends a grant request (for example, call interface Grant for sending a grant request) to a kernel, where the grant request includes a grant parameter (for example, a cref), the grant parameter is used to indicate a to-be-granted capability, and the grant request is used to indicate the kernel to grant the to-be-granted capability to a grantee; and obtains a revoke parameter (for example, uref) returned by the kernel, where the revoke parameter is used by the grantor to manage (for example, revoke) the current grant.

In some implementations, the method further includes: the grantor sends a revoke request (for example, call interface Revoke for sending a revoke request) to the kernel, where the revoke request includes the revoke parameter (for example, uref), and the revoke parameter is used by the kernel to perform capability revocation.

In some implementations, the method further includes: the grantee sends a prepare request to the kernel (for example, call interface PrepareGrant for sending a grant receiving prepare request); and obtains a reject parameter (for example, rref) returned by the kernel, where the reject parameter is used by the grantee to manage (for example, reject) the granted capability.

In some implementations, the method further includes: the grantee sends a reject request (for example, call interface Reject for sending a reject request) to the kernel, where the reject request includes the reject parameter (for example, rref), and the reject parameter is used by the kernel to perform capability rejection.

In addition to the data structure and the method, an apparatus, a computer storage medium, a computer program product, an application programming interface (API), and the like implement the method.

According to a sixth aspect, a computer device includes a hardware layer and an operating system running on the hardware layer, the operating system includes a kernel, and the kernel is configured to perform the method provided in any one of the foregoing aspects. The grantor and the grantee may be processes in the operating system or application processes. The kernel may be a microkernel or may be a macrokernel. The computer device may be a terminal device, such as a smartphone. Alternatively, the computer device may be an intelligent device applied to unmanned driving, a virtual reality/augmented reality/mixed reality device, an artificial intelligence device, or the like.

According to a seventh aspect, a capability management apparatus includes one or more modules, configured to implement the method provided in any one of the foregoing aspects. In some implementations, the apparatus may be an operating system or a kernel of the operating system. The kernel may be a microkernel or may be a macrokernel. In some implementations, the apparatus may be a user mode application.

According to an eighth aspect, a computer device includes one or more processors and a memory, the memory is configured to store computer-readable instructions, and the one or more processors are configured to read the computer-readable instructions to implement the method provided in any one of the foregoing aspects. The computer device may be a terminal device, such as a smartphone. Alternatively, the computer device may be an intelligent device applied to unmanned driving, a virtual reality/augmented reality/mixed reality device, an artificial intelligence device, or the like.

According to a ninth aspect, a non-transitory computer storage medium is configured to store a computer program, and when the computer program is executed by one or more processors, the method provided in any one of the foregoing aspects is implemented.

According to a tenth aspect, a computer program product is configured to store a computer program, and when the computer program is executed by one or more processors, the method provided in any one of the foregoing aspects is implemented.

In some implementations, the computer program product is an operating system or a kernel of the operating system. In some other implementations, the computer program product is an application.

According to an eleventh aspect, one or more APIs may be provided by a kernel for a user mode process in a form of a system call, for invocation by the user mode process, to implement any one or more of the capability management methods.

The solutions may be applied to a microkernel architecture or may be applied to a macrokernel architecture. The capability management method can implement granting and revocation of an access permission for a kernel object and can also ensure a deterministic latency.

BRIEF DESCRIPTION OF DRAWINGS

The following briefly describes accompanying drawings that show some embodiments.

DETAILED DESCRIPTION OF THE EMBODIMENTS

Figure 1:
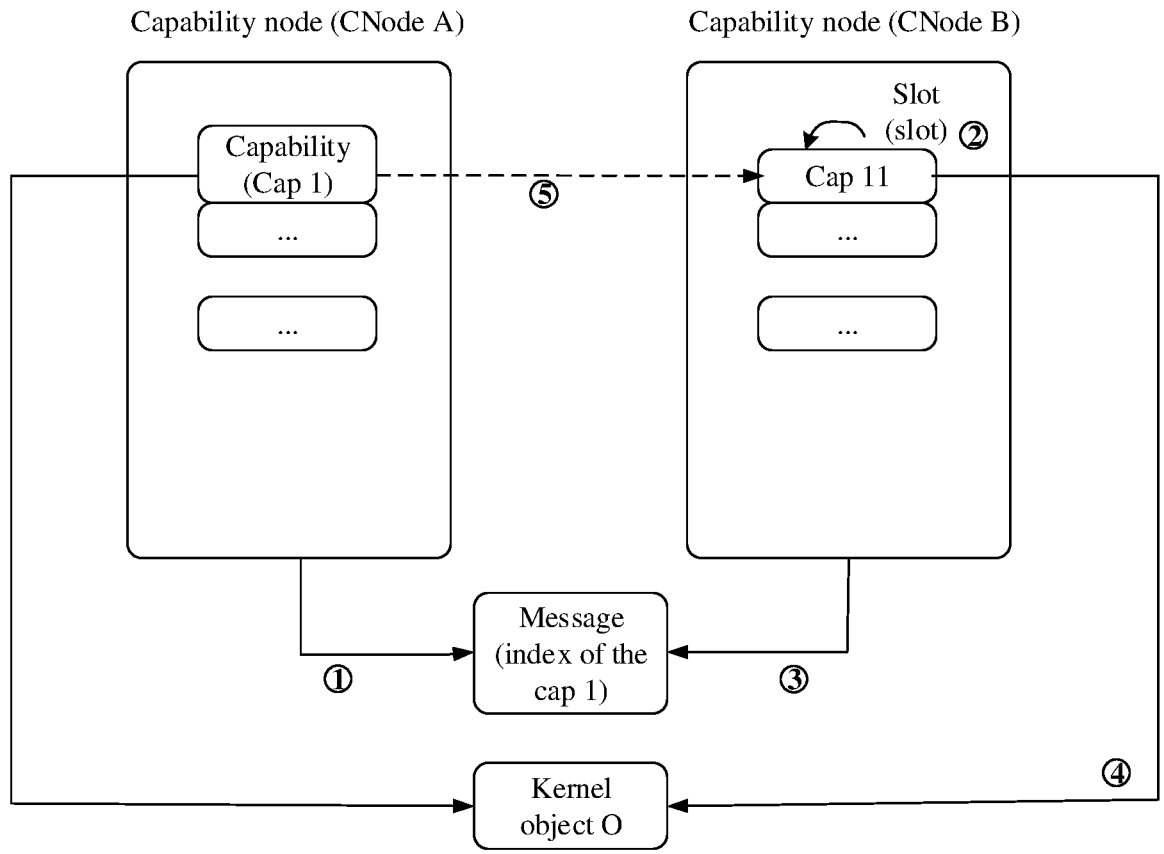
FIG. 1 is a schematic diagram of a capability copying procedure in the conventional technology.

To facilitate understanding of the embodiments, the following first describes concepts. It should be understood that these technical concepts are applied to the embodiments to be described below. However, these embodiments are merely some embodiments of solutions. Therefore, these concepts are not necessarily applied to all the embodiments.

Macrokernel: The macrokernel is an operating system kernel architecture. The architecture has a feature that an entire kernel program runs in kernel space. Compared with another type of operating system architecture such as a microkernel architecture or a mixed kernel architecture, the macrokernel separately provides a unified high-layer virtual interface of computer hardware. The macrokernel provides a series of system calls to implement various operating system services, such as process management, program concurrency, memory management, and various driver programs.

Microkernel: The microkernel is another operating system kernel architecture. The architecture has a feature that as few functions as possible are run in kernel space (kernel space) and necessary mechanisms are provided to implement an operating system. These mechanisms include address space management, thread management, interprocess communication, and the like. Compared with the macrokernel, the microkernel enables many components such as a file system and a network protocol stack to run in a user mode and enables a quantity of real kernel functions of the microkernel to be reduced to a very small quantity.

Process: The process is a running entity of a program. The program is a description of an instruction, and data and an organization form thereof, and the process is the running entity of the program. There may be a plurality of concurrent threads in one process, and all the threads execute different tasks in parallel. The thread may be an actual operating unit of the process. However, in the embodiments, the thread is not clearly distinguished from the process and is replaced with the process during description.

User mode process: The user mode process is a process that runs in a user mode instead of kernel space. A function implemented by each of the user mode process and a kernel is implemented by using software code. Therefore, a method executed by each of the user mode process and the kernel may also be considered as a method executed by a processor after the processor reads the software code.

Deterministic latency: A latency is service execution time, and the deterministic latency means that it needs to be ensured that the service execution time fluctuates within a limited range. For example, if an obstacle in front of an unmanned driving system or an assisted driving system needs to be identified, obstacle identification time needs to be controlled within a fluctuation range. Otherwise, a sensing service cannot be planned, and a control service after the sensing service cannot make a mechanical response, for example, perform braking, within determined time. A deterministic latency of the entire system is jointly determined by all components in the system. A deterministic latency of an operating system is a root of the deterministic latency of the entire system. This requires a kernel to respond to a user mode process within a determined time range.

Capability derivation relationship: If a process A needs to share a kernel object O with a process B, the process A copies a capability C of the kernel object in a capability node of the process A to a capability node of the process B as a capability C1. In this way, the process B can access the kernel object O. The capability C1 is derived from the capability C. The process B can further continue sharing. The process B can further copy the capability C1 to a capability node of a process C as a capability C2. The capability C2 is directly derived from the capability C1 and indirectly derived from the capability C. This relationship between C, C1 and C2 is the capability derivation relationship.

Interprocess communication: The interprocess communication is a communication mechanism that is provided by an operating system and that allows processes to transfer messages with each other.

Capability granting in the conventional technology is implemented through capability copying (or referred to as derivation). The capability copying is completed through interprocess communication. A to-be-granted capability is stored in a transmit buffer of a grantor. The transmit cache may further store a quantity of capabilities, and a plurality of capabilities may be granted once. A grantee receives a capability by receiving a message and provides capability storage space.

FIG. 1 shows an example of a capability copying procedure. It is assumed that a process A needs to grant a capability cap 1 to a process B. The cap 1 records an access permission for a kernel object O. The cap 1 is stored in a slot (slot) of a capability node CNode A of the process A.

Step 1: The process A sends a message to the process B, where the message includes an index (or referred to as an identifier) of the cap 1. The grant operation is initiated by the process A. The process A sends the message by invoking a system call and specifies the index of the capability in the message. The message is transmitted by a kernel.

Step 2: The process B applies for a new storage unit in a CNode B of the process B and obtains an index of the storage unit. The operation is initiated by the process B. The process B enters the kernel by invoking a system call, and the kernel allocates a storage unit slot (slot) in the CNode B. The slot is a capability storage unit commonly used in an existing microkernel operating system.

Step 3: The process B receives the message, and specifies, as a capability storage unit, the slot allocated in the previous step. The operation is initiated by the process B. The process B receives the message by invoking a system call and specifies the capability storage slot.

Step 4: The kernel copies content of the cap 1 to the slot to become a cap 11. Because the cap 11 includes an index of the kernel object O, the kernel object O can be indexed based on the slot after step 4.

Step 5: The kernel records a derivation relationship between the cap 1 and the cap 11. There are a plurality of derivation relationship recording manners. For example, a correspondence between the index of the cap 1 and an index of the cap 11 is recorded, or a correspondence between the slot storing the cap 1 and the slot storing the cap 11 is recorded.

The foregoing is merely an example, and a sequence of the steps may change during implementation. For example, step 2 and step 1 are interchangeable in terms of sequence, or an initial grant requester may be a grantee. Examples are not listed one by one.

The conventional technology includes at least two capability deletion cases. In a first case, a grantor revokes a capability. The grantor initiates a capability revoke request to a kernel and specifies an index of a to-be-revoked capability. The kernel deletes, based on a capability derivation relationship, all capabilities derived from the capability, including a directly derived capability and an indirectly derived capability. In a second case, a grantee rejects a grant. The grantee initiates a capability deletion request to a kernel and specifies a to-be-deleted capability by using an index specifying a slot. The slot is a slot that stores the to-be-deleted capability. The kernel deletes the capability from a CNode of the grantee.

Capability granting and revocation can be implemented by using a capability mechanism provided in the conventional technology, but a deterministic latency cannot be ensured. Because copying is required in a capability granting procedure, a plurality of capabilities may point to a same kernel object. Therefore, when a grantee actively rejects a grant of a capability, there may be two cases: 1. When the capability is not the last capability that points to a kernel object included in the capability, only the capability needs to be deleted from a capability node. 2. When the capability is the last capability that points to the kernel object, both the capability and the kernel object need to be deleted. Otherwise, a memory leak is caused because there is no other manner for accessing the kernel object. Because different time is consumed in the foregoing different cases, this poses a great challenge to deterministic latency analysis. When a latency of a program is analyzed, for behavior of deleting a capability, because it is uncertain whether the capability is the last capability referring to a kernel object, the latency can be analyzed only based on a worst case. That is, the latency is calculated based on a case in which kernel object revocation is triggered. In this way, a latency analysis result is always worst, but this is not always consistent with an actual running result. Therefore, this latency analysis is inaccurate. In other words, a latency in active capability rejection cannot be determined, making it very difficult to determine the latency of the entire program.

To resolve the foregoing problem, a capability management method proposes a concept of a capability owner. The capability owner stores grant information in own storage space to implement centralized capability management, thereby implementing a deterministic latency in capability revocation. The grant information herein includes granting capability information and granted capability information.

Figure 2:
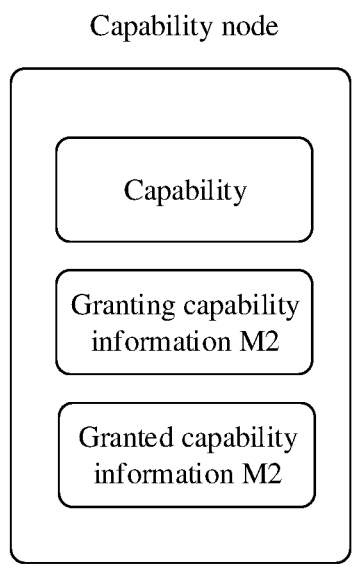
FIG. 2 is a schematic diagram of a capability node.

FIG. 2 is a schematic diagram of a logical structure of storage space of a capability owner according to an embodiment. The capability owner is a process, and grant information storage space of the process is a capability node. As shown in FIG. 2, the capability node includes three types of information: "capability", "granting capability information M2", and "granted capability information M1". For example, if a capability is granting, the capability is recorded in the "granting capability information"; or if a capability is granted by another process, the capability is recorded in "granted capability information".

Neither the "granting capability information M2" nor the "granted capability information M1" recorded in the capability node is a capability, and the "granting capability information M2" and the "granted capability information M1" are grant information indicating the two grant relationships. A corresponding capability can be indexed by using the information. The "granting capability information M2" is information used to indicate that the capability is granting. For example, an identifier may be added to a capability to indicate that the capability has been granted, or as described in the following embodiment, an identifier of a granting capability is stored by using an additional data structure. Similarly, the "granted capability information M1" is information used to index a granted capability, and a capability stored in a capability node of a grantor can be found by using the information.

It should be understood that, in an operating system, not all capability nodes of all processes need to include the foregoing three types of information, and capability nodes of some processes each may not include a granting capability and/or a granted capability.

A process is an owner of a "capability" included in a capability node of the process. According to the conventional technology, once a "capability" is granting, the "capability" is copied to a capability node of another process. However, in the method, capability copying is not required, provided that grant relationships are recorded by using "granting capability information" and "granted capability information". Therefore, a capability cannot be copied and has only one "owner" regardless of whether the capability is granted.

There are a plurality of capability owner determining manners. For example, a kernel grants a capability to a process; in other words, creates the capability in a CNode of the process. Alternatively, when a process creates a kernel object, a capability corresponding to the kernel object is also created. In this case, the process is an "owner" of the capability. A capability owner determining manner is not limited. In addition, the capability owner is allowed to be changed. For example, an owner of a capability may be changed from a process A to a process B. This does not affect the method.

It should be noted that in this embodiment, one kernel object corresponds to only one capability, and there is a one-to-one correspondence between the kernel object and the capability. Each capability has one owner and is stored in a capability node of the owner. However, in another embodiment, it is possible, in an entire operating system, that some kernel objects each correspond to a plurality of capabilities and the capabilities are respectively stored in a plurality of capability nodes and may depend on an actual requirement. This is not limited.

Figure 3:
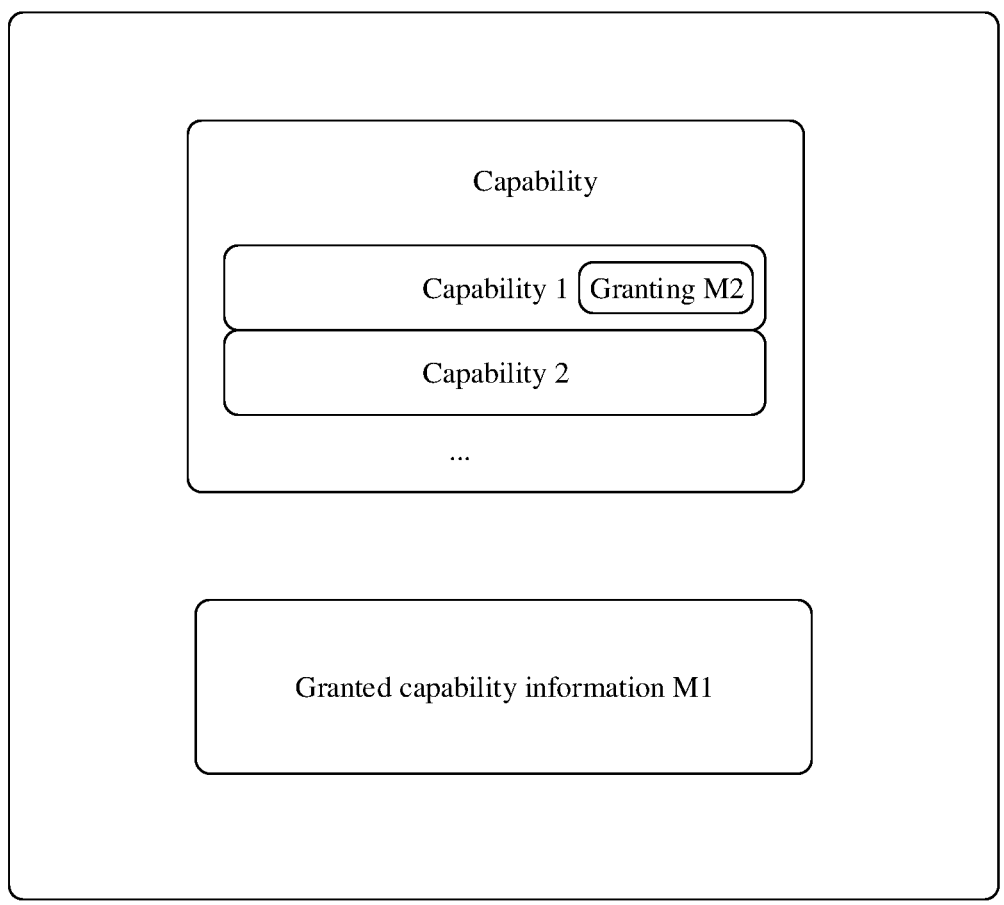
FIG. 3 is a schematic diagram of another capability node.

FIG. 3 shows another embodiment of storage space. As shown in the figure, a capability node stores a plurality of capabilities, and some of the capabilities can be identified as granting by adding additional information (M2). The additional information may include a grantee to which the capability is granted and a granting permission. A capability to which the additional information is not added may be considered as not granting. Further, the capability may be alternatively identified as not granting by adding another additional information.

Figure 4:
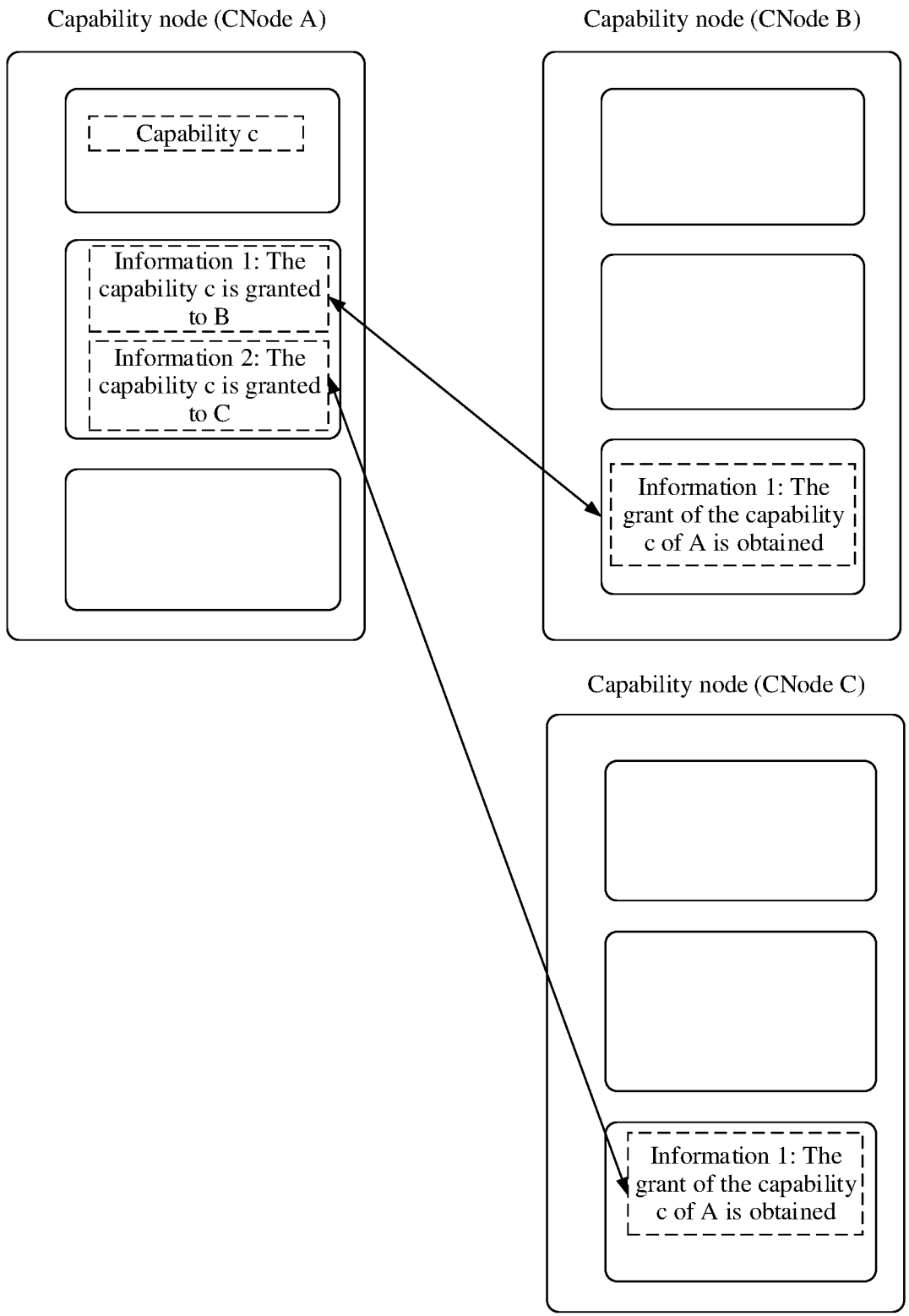
FIG. 4 is a schematic diagram of a plurality of capability nodes in a capability granting scenario.

FIG. 4 shows an example in which a grantor grants a capability to a grantee. FIG. 4 shows that a process A separately grants a capability c stored in the process A to a process B and a process C. As shown in the figure, a CNode A stores two pieces of information, information 1 indicates that the capability c is granted to the process B, and information 2 indicates that the capability c is granted to the process C. A CNode B stores information 1, and the information 1 indicates that the grant of the capability c of the process A is obtained. A CNode C stores information 1, and the information 1 indicates that the grant of the capability c of the process A is obtained. If the process B or the process C rejects the grant of the capability c, a kernel may delete the information 1 in the CNode B or the CNode C. If the process A revokes the capability c granted to the process B, the kernel may delete the information 1 in the CNode A. If the process A revokes the capability c granted to the process C, the kernel may delete the information 2 in the CNode A.

FIG. 2 to FIG. 4 describe the data structure of the capability node and the information that may be stored in the data structure. There are many implementations of the data structure or the information stored in the data structure. The following embodiments use a data structure commonly used in a microkernel system as an example to describe implementations of the solutions. It should be understood that the following implementations are merely examples, and a person skilled in the art can easily change a data structure or an information form based on these implementations and can also implement the solutions.

Figure 5:
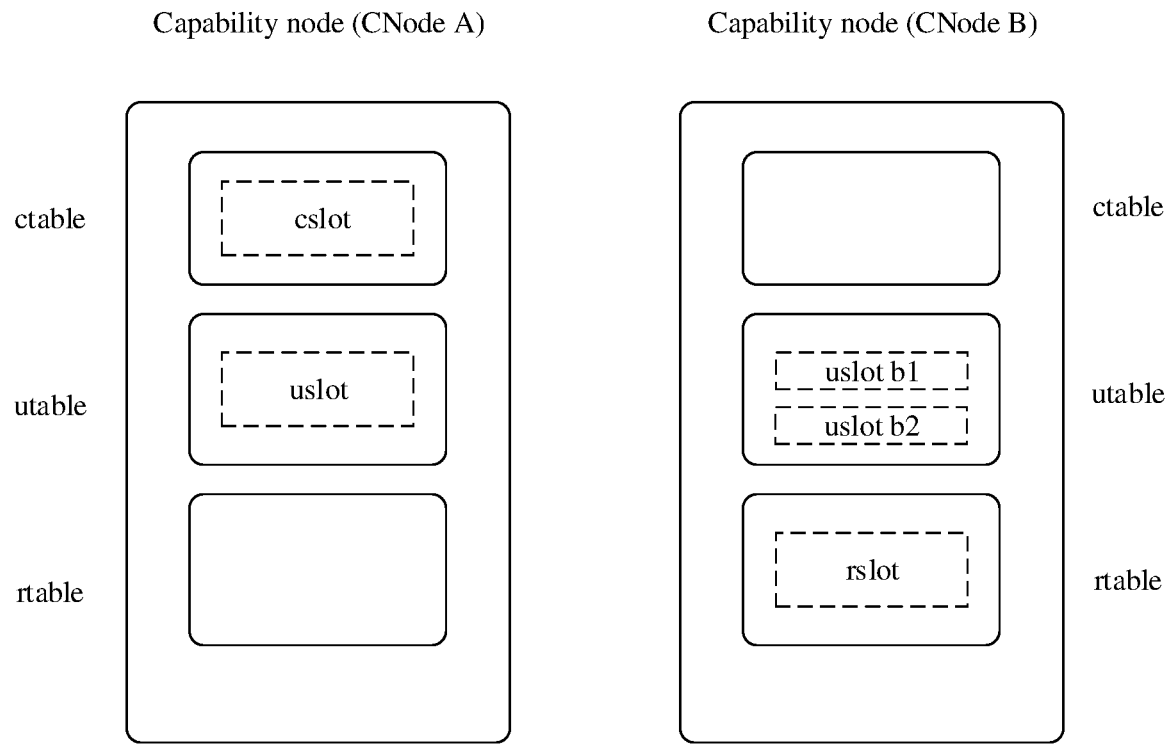
FIG. 5 is a schematic diagram of capability nodes.

FIG. 5 is a schematic diagram of a logical structure of a capability node according to an embodiment. A CNode A is a capability node of a process A, and a CNode B is a capability node of a process B. The two capability nodes each include three data structures: a capability table (ctable for short), an authorization table (utable for short), and a reference table (rtable for short).

It should be noted that the "tables" are merely used herein as names of the three data structures. However, during actual implementation, the data structure may be implemented in a plurality of forms and is not limited to the table.

The ctable is used to record a capability owned by a process. Each capability is stored in one slot. The slot is referred to as a cslot. The capability can be directly accessed only by a kernel. Each capability has a unique reference referred to as a cref. A user mode process can specify a to-be-accessed capability by using a cref. For example, when initiating a grant, the process A specifies a to-be-granted capability by using a cref. It should be understood that, for ease of description, only one cslot is shown in the figure. During actual implementation, there may be a plurality of cslots. Similarly, there may be a plurality of uslots and rslots.

It should be noted that in another embodiment, a plurality of capabilities may be stored in one slot, provided that the capabilities can be distinguished from each other.

The utable records capability grant information or granting capability information. The capability grant information is stored in a uslot. The capability grant information records a granted capability, a granted permission, and a grantee to which the capability is granted. There is a plurality of granted capability recording manners. For example, a reference cref of a capability is directly recorded, or an index of a cslot including the capability is recorded. Each uslot has a unique reference referred to as a uref. A user mode process specifies, by using a uref, a uslot that the user mode process needs to access. For example, when revoking a grant, a grantor may specify a to-be-revoked capability by using a uref.

The rtable records granted information. The granted information is stored in an rslot. The rslot records granted capability information. Each rslot has a unique reference referred to as an rref. A user mode process specifies, by using an rref, an rslot that the user mode process needs to access. For example, when rejecting a grant, a user mode process may specify a to-be-rejected capability by using an rref. A kernel object corresponding to the access is also specified by using the rref. The rslot may further have an index, and the index is used to identify a location of the rslot in the rtable.

It should be noted that, in this embodiment, neither the uslot nor the rslot stores a capability, but a capability corresponding to each of the uslot and the rslot may be found based on information stored in each of the uslot and the rslot. The figure shows only an rtable in the CNode B. It may be understood that, if an rtable exists in the CNode A, the rtable is similarly implemented.

Because the uslot and the rslot respectively record the granting capability information and the granted capability information, in the example in FIG. 5, there is a correspondence between a uslot in the CNode A and an rslot in the CNode B; in other words, the corresponding rslot can be found based on the uslot, and the corresponding uslot can be found based on the rslot.

Further, a capability may be granted for a plurality of times. Therefore, a plurality of uslots may correspond to the capability and a to-be-revoked grant may be specified by using a uref. As shown in FIG. 5, two uslots are depicted in the CNode B for an illustration purpose: a uslot b1 and a uslot b2. The uslot b1 records that the process B grants a capability to a process C, and the uslot b2 records that the process B grants the capability to a process D, where granted permissions may be the same or may be different. In this way, two grants of one capability are respectively recorded by using two uslots. When needing to revoke the capability granted to the process D, the process B may delete the uslot b2 by using a reference uref of the uslot b2.

When a grantor revokes a capability, in the conventional technology, the grantor specifies, by using an index, such as a cref, of the capability, the capability that needs to be revoked. In this way, all grants of one capability are revoked at one time. However, in the method provided in this embodiment because different grants of a same capability correspond to different uslots, a grant that needs to be revoked can be specified by using a reference of a uslot. In this way, fine-grained and more accurate grant revocation can be implemented.

It should be understood that, if a system does not need such accurate revocation or a system specifies that one capability can be granted only once, in the method provided, a capability that needs to be revoked may be alternatively specified by using a reference cref of the capability.

Figure 6:
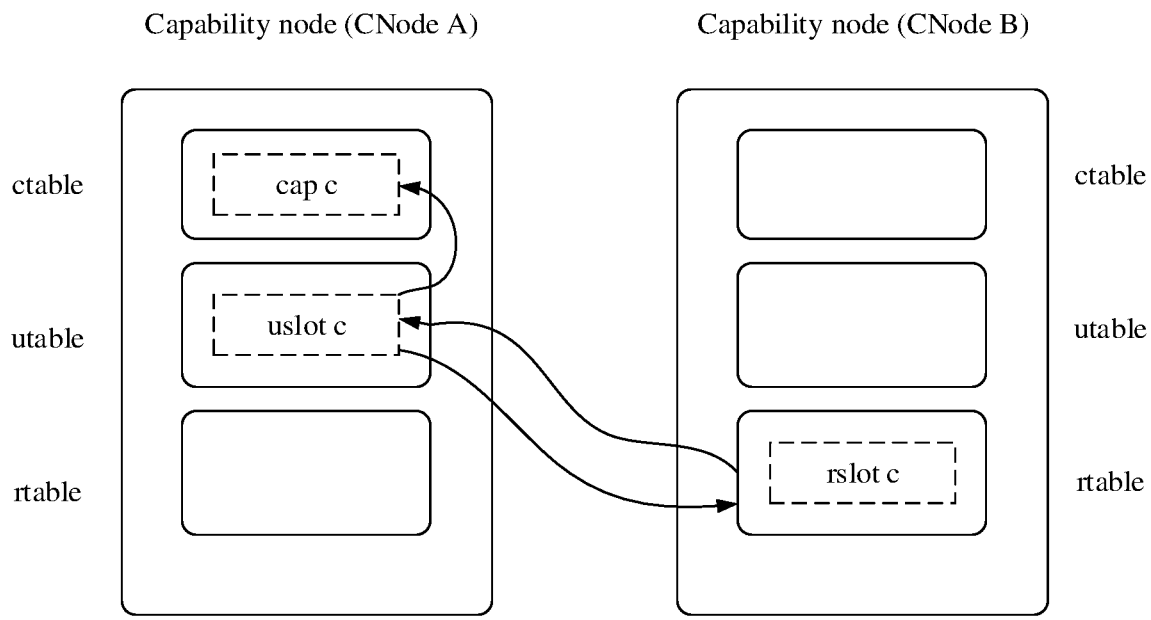
FIG. 6 is a schematic diagram of a capability granting procedure.

FIG. 6 shows an example of a capability granting procedure based on FIG. 5. It is assumed that a to-be-granting capability is a capability cap c of a process A, the cap c is stored in a cslot c of a ctable, and a kernel object corresponding to the cap c is a kernel object o. As shown in the figure, the capability granting procedure includes the following steps:

Step 1: A process B invokes a system call to initiate a grant request operation. After the process B invokes the system call, the kernel allocates an item rslot c in an rtable of a CNode B, and returns a reference rref of the rslot c to the process B. The rslot c herein represents an rslot corresponding to the cap c.

Step 2: The process A invokes a system call to initiate a grant operation. After the process A invokes the system call, the kernel allocates an item uslot c in a utable of a CNode A. The uslot c herein represents a uslot corresponding to the cap c.

Step 3: The kernel records an index of the cap c in the uslot c. This step establishes a relationship between the uslot c and the cap c, and records that the granting capability is the cap c.

Step 4: The kernel records an index of the uslot c in the rslot c, and further records an index of the rslot c in the uslot c. The kernel returns a reference uref of the uslot c to the process A. This step establishes an association between the uslot c and the rslot c, and records that the cap c is granted to the rslot c and the grant to the rslot c comes from the uslot c.

It should be understood that in an operating system, a user mode process enters a kernel state by using a system call, then a kernel executes a program, and then the user mode process is returned after the execution.

After the capability granting procedure is executed, the process B can access the rslot c based on the rref, then access the uslot c based on information recorded in the rslot c, and then access the cap c based on information recorded in the uslot c.

After the granting, the process B accesses the kernel object o in the following procedure: The process B specifies, by using the rref of the rslot c, that the process B needs to access the kernel object o. The kernel finds the corresponding rslot c from the CNode B of the process B based on the rref, and then finds the corresponding uslot c based on the rslot c (in the CNode A of the process A). An access permission for the kernel object o is recorded in the uslot c (a permission granted to the process B is recorded herein). If the operation requested by the process B is not allowed based on the permission in the uslot c, the access is refused. Otherwise, the access is allowed. In another possibility, if the access permission for the kernel object is not recorded in the uslot c, the kernel can find the cap c based on the index that is of the cap c and that is recorded in the uslot c, and determine, based on a permission recorded in the cap c, whether the access can be performed.

It should be noted that, provided that it can be ensured that the information recorded in the uslot c and the rslot c records a relationship between a granting capability or a granted capability; in other words, it can be ensured that a grantee can find a corresponding capability, the uslot c and the rslot c are not limited to recoding only the mutual indexes, and may further include other information or record other information (for example, directly record the mutual references).

Figure 7A:
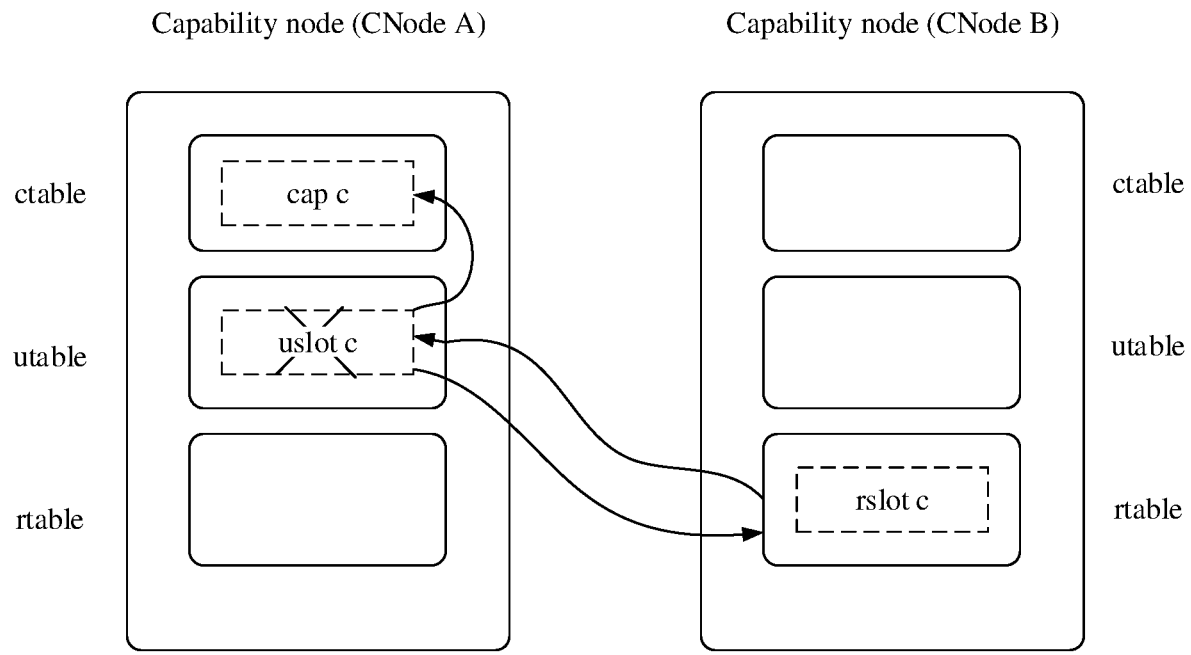
FIG. 7A is a schematic diagram of a procedure of revoking a capability by a grantor.
Figure 7B:
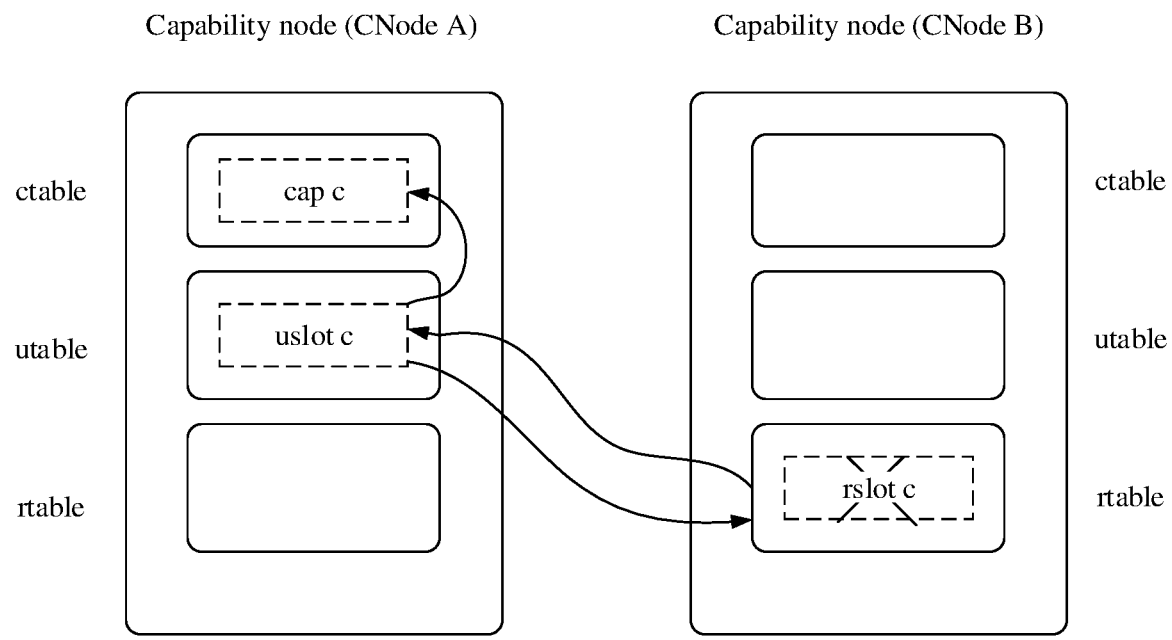
FIG. 7B is a schematic diagram of a procedure of rejecting a capability by a grantee.

Further, FIG. 7 shows an example of a capability revocation procedure based on FIG. 5. FIG. 7(A) is a procedure of revoking a capability grant by a process A. FIG. 7(B) is a procedure of rejecting a capability grant by a process B.

As shown in FIG. 7(A), the process A can revoke, only by deleting a uslot c, a cap c granted to a process B.

It should be noted that, in this embodiment, an rslot c does not need to be deleted. After the uslot c is deleted, the grant is terminated because the process B cannot access the corresponding capability by using a uref of the uslot c. In another embodiment, deletion of the rslot c may be considered, but is not mandatory.

As shown in FIG. 7(B), the process B can discard a grant of a cap c only by deleting an rslot c. Similarly, a uslot c does not need to be deleted simultaneously.

It should be noted that a slot is similar to a storage container and deleting the uslot c or deleting the rslot c means deleting both data stored in the uslot c or the rslot c and this structure (this structure is also data). In some other embodiments, only data stored in a container may be deleted while the container may be retained.

It may be understood that in the method provided in this embodiment, in a procedure in which a grantee rejects a grant, a grantor needs to delete only a corresponding rslot without deleting a capability or deleting a memory object. Therefore, this latency can be determined. In addition, only the rslot is deleted, so that less time is needed compared with operations such as deleting a capability and determining whether the capability is the last capability in the conventional technology.

In addition, because a capability is held only by an owner, the owner can delete a kernel object corresponding to the capability or the capability at any time, so that the kernel object can be managed more centrally and effectively. When deleting the capability, the capability owner needs to delete the kernel object, so that this latency can also be determined.

Further, an owner may record different grant information about granting a same capability to different processes. In this way, when the capability is revoked, a grant can be accurately revoked. In this case, in the conventional technology, all grants need to be first revoked, and then a grant that does not need to be revoked is recovered. Compared with the conventional technology, the revocation method provided in this embodiment is more accurate and consumes less time.

In the conventional technology, there may be cascading granting. For example, a process A copies a capability of the process A to a process B and the process B further copies the capability to a process C. When the process A revokes the grant, the corresponding capability of the process C also needs to be revoked. Consequently, when a grantor revokes a capability, a quantity of permissions that need to be revoked is uncertain. To implement a deterministic latency, an entire revocation algorithm is complex. However, in the method, when revoking a grant, a grantor needs to delete only a grant relationship record without triggering cascading revocation or triggering kernel object deletion. Therefore, no complex revocation algorithm is needed, so that a revocation speed is faster than that in the conventional technology.

Figure 8:
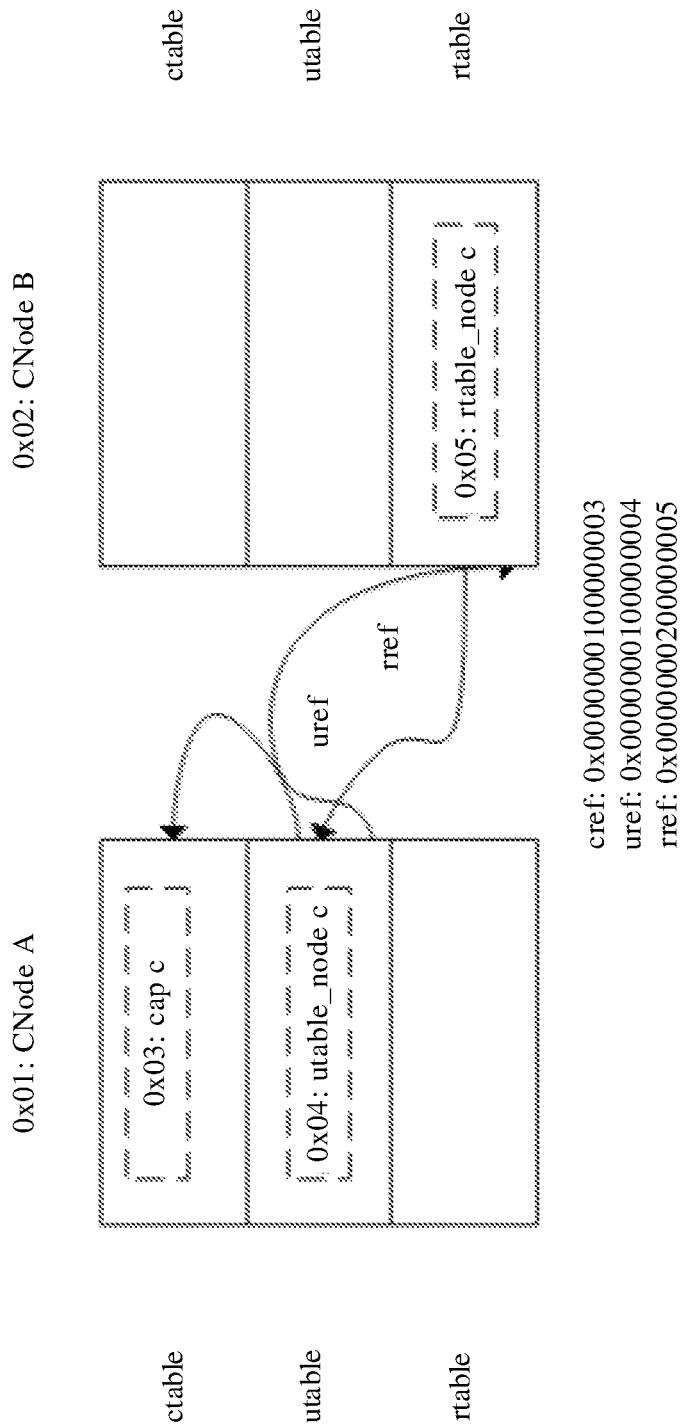
FIG. 8 is a schematic diagram of capability nodes.

The following uses an embodiment implemented in a microkernel, to describe the capability management method. As shown in FIG. 8, in a microkernel system, a capability mechanism is implemented based on three tables. In a CNode, a ctable, a utable, and an rtable are implemented by using a data structure map, and each element in the three tables corresponds to one index. In another embodiment, the three tables may be implemented by using another data structure such as a set or an array.

The ctable is implemented by using a map in which an index is a positive integer and a value is capability. Each capability stores two parts of information: (a) a reference of a kernel object; and (b) a permission to access the kernel object. A reference cref of the capability is represented by using a 64-bit integer in which the first 32 bits are an index of a CNode of an owner of the capability and the last 32 bits are an index of the capability in a ctable of the CNode of the owner. An index of the CNode is a number of the CNode in CSpace.

As shown in FIG. 8, an index of a CNode A is 0x01, an index of a cap c in a ctable of the CNode A is 0x03, and a cref of the cap c is 0x0000000100000003.

The utable is implemented by using a map in which an index is a positive integer and a value is utable_node. Each utable_node stores four parts of information: (a) an index of a granted capability in the ctable; (b) a granted permission; (c) an index of a CNode of a grantee; and (d) an index of rtable_node of the CNode of the grantee in an rtable. A reference uref of utable_node is represented by using a 64-bit integer in which the first 32 bits are an index of a CNode and the last 32 bits are an index of utable_node in the utable.

As shown in FIG. 8, the index of the CNode A is 0x01, and an index of utable_node c in a utable is 0x04. Therefore, a uref corresponding to utable_node c is 0x0000000100000004.

The rtable is implemented by using a map in which an index is a positive integer and a value is rtable_node. Each rtable_node stores two parts of information: (a) an index of a CNode of a grantor; and (b) an index of utable_node of the CNode of the grantor in the utable. A reference rref of rtable_node is represented by using a 64-bit integer in which the first 32 bits are an index of a CNode and the last 32 bits are an index of rtable_node in the rtable.

As shown in FIG. 8, an index of a CNode B is 0x02, and an index of rtable_node c in an rtable is 0x05. Therefore, a reference rref of rtable_node c is 0x0000000200000005.

In this embodiment, to implement granting of the cap c, implementation steps are as follows:

Step 1: A kernel allocates rtable_node c in the rtable of the CNode B. Then, a process B obtains the reference rref of rtable_node c.

Step 2: The kernel allocates utable_node c in the utable of the CNode A. Then, a process A obtains the reference uref of utable_node c.

Step 3: The kernel records the index of the cap c in the ctable and a granting permission in utable_node c. Optionally, if a permission is not modified in a granting procedure, the granting permission may not be recorded.

Step 4: The kernel records, in rtable_node c, (a) the index of utable_node c in the utable of the CNode A and (b) the index of the CNode A. Further, the kernel records, in utable_node c, (a) the index of rtable_node c in the rtable of the CNode B and (b) the index of the CNode B.

It should be noted that a combination of the index of utable_node c in the utable of the CNode A and the index of the CNode A may be considered as the reference uref of utable_node c. Similarly, a combination of the index of rtable_node c in the rtable of the CNode B and the index of the CNode B may be considered as the reference rref of rtable_node c. In this embodiment, when information that constitutes a reference is separately stored, the purpose can also be achieved. During actual implementation, the uref and the rref may further include other information, such as identification information, used to identify types of the uref and the rref.

After the grant procedure of the cap c is executed, information stored in utable_node c includes: (a) the index 0x03 of the capability cap c; (b) the granting permission, for example, read-only; (c) the index 0x02 of the CNode B; and (d) the index 0x05 of rtable_node c in the rtable; and information stored in rtable_node c includes: (a) the index 0x01 of the CNode A; and (b) the index 0x04 of utable_node c in the utable.

It is easy to understand that the foregoing implementation also has some variant implementations. For example, rtable_node c may record the uref of utable_node c, and therefore include both the index of the CNode A and the index of utable_node c of in the utable of the CNode A.

It should be noted that, in this embodiment, utable_node is an implementation of the uslot in the foregoing embodiments, and rtable_node is an implementation of the rslot in the foregoing embodiments.

If the process A wants to revoke the grant, the process A invokes a system call to delete utable_node c corresponding to the uref. If the process B wants to reject the grant, the process B invokes a system call to delete rtable_node c corresponding to the rref.

This embodiment may further provide new application programming interfaces (API) (namely, the foregoing system calls), so that a user mode process implements the foregoing capability granting and capability revocation procedure:

Interface PrepareGrant: The interface PrepareGrant is used by a grantee to prepare to receive a grant. The invoker obtains an rref, and then accesses a received capability by using the rref. For example, the process B may invoke the interface in the foregoing step 1.

Interface Grant: A grantor starts a grant. The invoker specifies a granted capability by using a cref, and obtains a uref. Then, the invoker manages this grant, for example, revokes the grant, by using the uref. For example, the process A may invoke the interface in the foregoing step 2.

Interface Revoke: A grantor revokes a grant. The invoker specifies a to-be-revoked grant by using a uref. For example, the process A may invoke the interface during the foregoing grant revocation.

Interface Reject: A grantee rejects a grant. The invoker specifies a to-be-rejected grant by using an rref. For example, the process B may invoke the interface during the foregoing grant rejection.

It should be noted that the interface names PrepareGrant, Grant, Revoke, and Reject are merely examples and are not limited thereto.

The procedure of this embodiment is briefly described. For more implementations, for example, grant initiation, refer to the foregoing embodiments.

It may be understood that in a conventional-technology solution, a grantee rejects a grant by deleting a capability, and because capability copying exists, a plurality of capabilities may point to one kernel object, causing an uncertain latency in the capability deletion. In this embodiment, a grant is completed by storing a grant relationship of a capability rather than copying the capability, and a grantee rejects a grant by deleting a grant relationship record, so that a deterministic latency can be implemented.

Further, in the method, only one capability points to one kernel object, and when a capability is deleted, a kernel object to which the capability points is deleted. In other words, the capability needs to be deleted only when the kernel object needs to be deleted.

Further, all capabilities are held by owners of the capabilities. The owner can manage a single grant by modifying a grant relationship record, thereby implementing more accurate, faster, and finer-grained capability management.

In summary, the method can also effectively support active sharing and revocation of a kernel object and implement process resource isolation while ensuring a deterministic latency, thereby maintaining flexibility of permission management and improving efficiency of operations such as capability granting and capability revocation.

Figure 9:
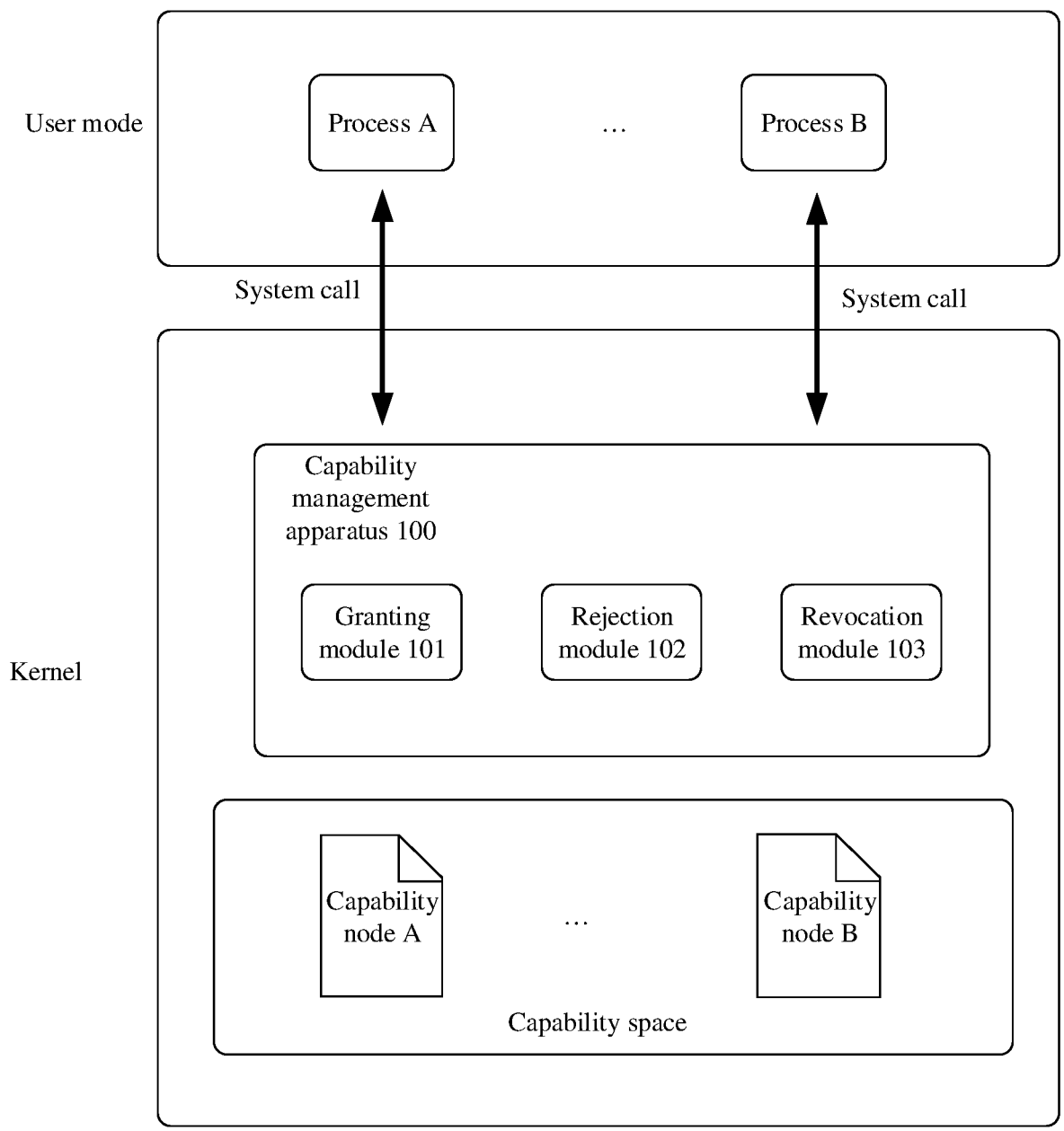
FIG. 9 is a schematic diagram of a logical structure of a capability management apparatus.

FIG. 9 is a schematic diagram of a logical structure of a capability management apparatus 100. As shown in the figure, the capability management apparatus 100 is located in a kernel of an entire computer system, and processes such as a user mode process A and a user mode process B each may use, by using a system call, the method provided by the capability management apparatus 100. The kernel stores a capability node A of the user mode process A and a capability node B of the user mode process B. All capability nodes are stored in capability space. This embodiment is described by using an example in which the process A is a grantor and the process B is a grantee.

The capability management apparatus 100 includes a granting module 101, a rejection module 102, and a revocation module 103, respectively configured to implement capability granting, capability rejection, and capability revocation.

The granting module 101 is configured to: receive a grant request sent by the process A, where the grant request is used to indicate to grant a target capability of the capability node A, and the target capability is stored only in the capability node A; record grant information in the capability node A, where the grant information is used to indicate that the target capability has been granted; and record granted information in the capability node B, where the granted information is used to search the capability node A for the target capability.

The rejection module 102 is configured to receive a reject request sent by the process B, where the reject request includes a first identifier, the first identifier is used to indicate a to-be-rejected capability, and the to-be-rejected capability is a capability granted by the process A to the process B; and delete first target information that matches the first identifier from the capability node B, where the to-be-rejected capability is stored only in the capability node A, and the first target information is used to search the capability node A for the to-be-rejected capability.

The revocation module 103 is configured to: receive a revoke request sent by the process A, where the revoke request includes a second identifier, the second identifier is used to indicate a to-be-revoked capability, and the to-be-revoked capability is a capability granted by the process A to the process B; and delete second target information that matches the second identifier from the capability node A, where the to-be-revoked capability is stored only in the capability node A, and the second target information is used to search the capability node A for the to-be-revoked capability, or the second target information is used to indicate that the to-be-revoked capability has been granted.

Optionally, when the process A grants a same capability to different processes, the second identifier is further used to indicate a target process, the target process is one of the different processes, and the second target information is further used to indicate the target grantee, and is, for example, an identifier of the target process, an identifier of a capability node of the target process, or an index of a slot in the foregoing embodiment, provided that the second target information can indicate a grantee to which the capability is granted.

For effects of the capability management apparatus 100 provided in this embodiment, refer to the foregoing method embodiments. Details are not described herein again.

Figure 10:
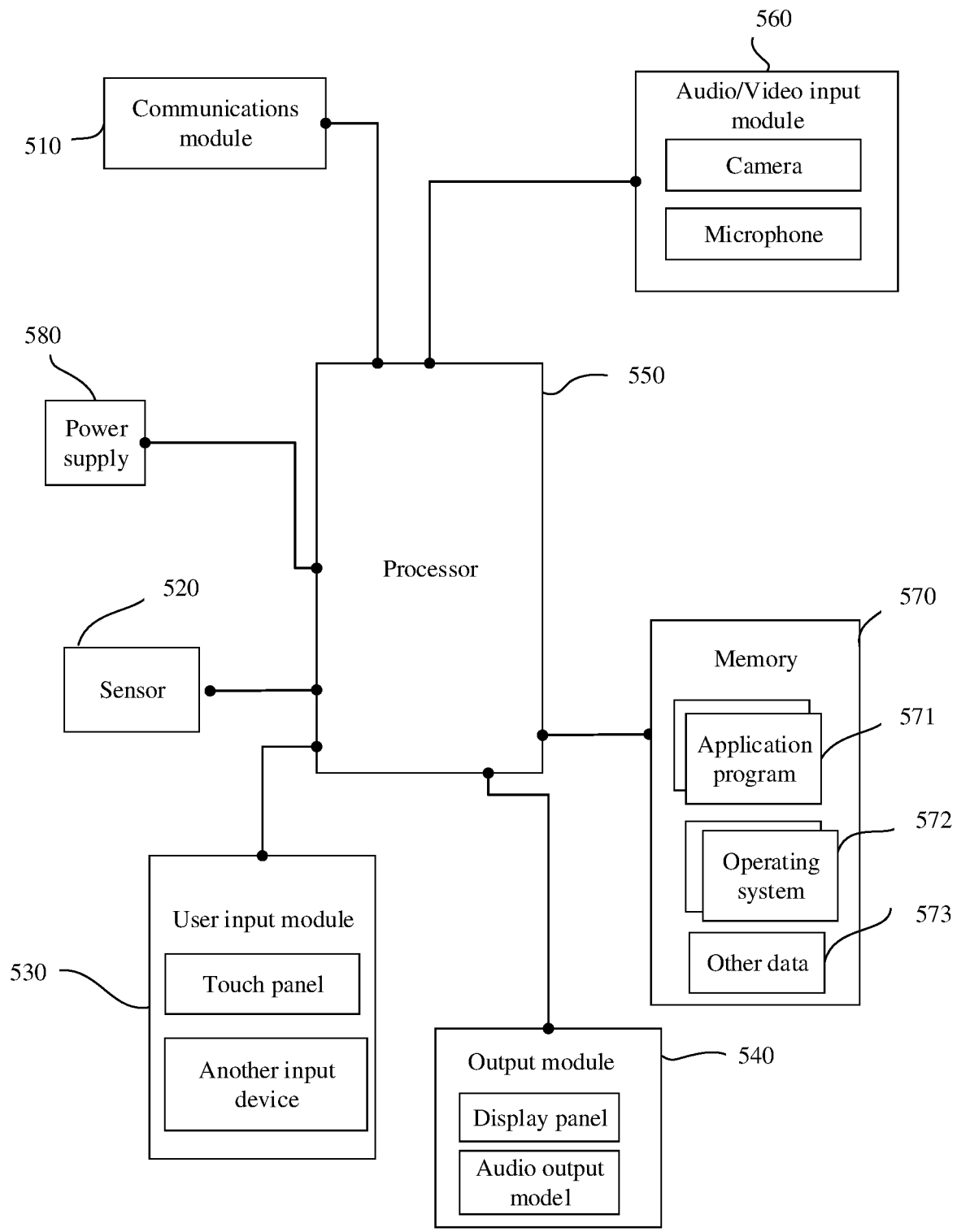
FIG. 10 is a schematic diagram of a logical structure of a computer device.

FIG. 10 is a schematic structural diagram of a computer system according to an embodiment. The computer system may be a smartphone, a smart home device (such as a large screen television, a smart television, or a smart voice device), an assisted self-driving device, or an unmanned driving device. As shown in the figure, the computer system includes a communications module 510, a sensor 520, a user input module 530, an output model 540, a processor 550, an audio/video input module 560, a memory 570, and a power supply 580.

The communications module 510 may include at least one module that can enable the computer system to communicate with a communications system or another computer system. For example, the communications module 510 may include one or more of a wired network interface, a broadcast receiving module, a mobile communications module, a wireless Internet module, a local area communications module, a location (or positioning) information module, and the like. The plurality of modules each have a plurality of implementations in the conventional technology and are not described one by one in this embodiment.

The sensor 520 can sense a current status of the system, for example, an open/closed state, a location, whether the system is in contact with a user, a direction, and acceleration/deceleration. In addition, the sensor 520 can generate a sensing signal used to control an operation of the system.

The user input module 530 is configured to: receive entered digital information or characteristic information or a contact touch operation/contactless gesture and receive signal input related to user settings and function control of the system, and the like. The user input module 530 includes a touch panel and/or another input device.

The output model 540 includes a display panel, configured to display information entered by the user, information provided for the user, various menu interfaces of the system, and the like. Optionally, the display panel may be configured in a form of a liquid crystal display (LCD), an organic light-emitting diode (OLED), or the like. In some other embodiments, the touch panel may cover the display panel, to form a touch display screen. In addition, the output model 540 may further include an audio output model, an alarm, a tactile module, and the like.

The audio/video input module 560 is configured to input an audio signal or a video signal. The audio/video input module 560 may include a camera and a microphone.

The power supply 580 may receive external power and internal power under the control of the processor 550, and provide power required by operations of the components in the system.

The processor 550 may indicate one or more processors. For example, the processor 550 may include one or more central processing units, or include one central processing unit and one graphics processing unit or include one application processing unit and one coprocessor (for example, a micro control unit or a neural network processor). When the processor 550 includes a plurality of processors, the plurality of processors may be integrated into a same chip or may each be an independent chip. One processor may include one or more physical cores, and the physical core is a minimum processing unit.

The memory 570 stores a computer program, and the computer program includes an operating system program 572, an application program 571, and the like. For example, a typical operating system is a microkernel operating system such as seL4, L4, or Fuchsia provided by Google; a system used for a desktop computer or a notebook computer, such as Windows of Microsoft or MacOS of Apple; or a system used for a mobile terminal, such as a Linux®-based Android® system developed by Google.

The memory 570 may be one or more of the following types: a flash memory, a hard disk-type memory, a micro multimedia card memory, a card memory (for example, an SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, or an optical disc. In some other embodiments, the memory 570 may alternatively be a network storage device in the Internet. The system may perform an operation such as updating or reading on the memory 570 in the Internet.

The processor 550 is configured to read the computer program from the memory 570, and then perform a method defined by the computer program. For example, the processor 550 reads the operating system program 572 to run an operating system in the system and implement various functions of the operating system or reads one or more application programs 571 to run an application in the system. If the solutions are implemented in a form of software, the solutions can be stored in the memory 570 in a computer program manner. The solutions function as all or a part of the operating system program 572 and are read and executed by the processor 550.

The memory 570 further stores other data 573 in addition to the computer program, for example, various capability nodes.

A connection relationship between the modules in FIG. 10 is only an example. A method provided in any embodiment may be also applied to a terminal device using another connection manner. For example, all the modules are connected by using a bus. Division into the modules in FIG. 10 is merely logical division and does not indicate that the modules are necessarily separated in terms of hardware. The modules in FIG. 10 may be not necessary in another embodiment.

In addition, a storage medium, a computer program product, a computer program, and the like are related to the solutions. For implementations, refer to the foregoing embodiments.

To describe the solutions, an implementation is divided into a plurality of parts for description. To enable a reader to better understand the solutions different cases to describe all of the solutions. It should be understood that there are some associations between the parts, and associated implementations may be mutually referenced. There are some repetitions between the cases and implementations of the parts, which can also be mutually referenced. However, this does not mean that a case needs to be implemented according to a procedure.

It should be noted that the capability, CNode, CSpace, and slot are concepts commonly used in an existing microkernel operating system. For ease of understanding by a person skilled in the art, the embodiments use these concepts as examples. However, it may be understood that names of the concepts may be changed.

It should be noted that, for ease of application and understanding, the embodiments name some systems, modules, components, elements, data structures, instructions, and the like that are described. Uppercase and lowercase forms of each of these names have the same meaning unless otherwise specified. In addition, these names may be changed as required. This should not be used as a limitation to the solutions.

It should be noted that the solutions provided in the embodiments may be applied to a terminal device, a server, or the like. The terminal device herein includes but is not limited to a smartphone, a vehicle-mounted apparatus (for example, a self-driving device), a personal computer, an artificial intelligence device, a tablet computer, a personal digital assistant, a smart wearable device (for example, a smart watch or band, or smart glasses), a smart voice device (for example, a smart speaker), a virtual reality/mixed reality/augmented reality device, or a network access device (for example, a gateway). The server may include a storage server, a computing server, or the like.

It should be noted that division of the modules or units proposed in the foregoing embodiments is only shown as an example, and functions of the described modules are merely described as an example and are not limited thereto. A person of ordinary skill in the art may combine functions of two or more of the modules or divide functions of one module to obtain more finer-grained modules and other variant manners as required.

The same or similar parts of the embodiments described above may be mutually referenced. "A plurality of" means two or more or "at least two" unless otherwise specified. "A/B" includes three cases: "A", "B", and "A and B". An "identifier (id)" of an object is information that uniquely identifies the object. The "identifier" may directly identify the object, and is, for example, a name of the object; or may indirectly indicate the object, and is, for example, a storage address of the object. "First", "second", "third", and the like are merely used to distinguish between expressions and are not intended to limit a sequence. In addition, due to a lack of sequence limitation, there may be "second" or "third" without a "first."

The described apparatus embodiment is merely an example. The modules described as separate parts may or may not be physically separate, and parts displayed as modules may or may not be physical modules, may be located in one location, or may be distributed on a plurality of network modules. Some or all the modules may be selected according to actual needs to achieve the objectives of the solutions of the embodiments. In addition, in the accompanying drawings of the apparatus embodiments, connection relationships between modules indicate that the modules have communication connections with each other, which may be implemented as one or more communications buses or signal cables. A person of ordinary skill in the art may understand and implement the embodiments without creative efforts.

The foregoing descriptions are merely implementations but are not intended as limiting.

What is claimed:

1. A capability management method, comprising:
   receiving a reject request sent by a grantee, wherein the reject request comprises a first identifier, the first identifier is used to indicate a to-be-rejected capability, and the to-be-rejected capability is a capability granted by a grantor to the grantee; and
   deleting first target information that matches the first identifier from a capability node of the grantee, wherein the to-be-rejected capability is stored only in a capability node of the grantor, and the first target information is used to search the capability node of the grantor for the to-be-rejected capability.

2. The capability management method according to claim 1, further comprising:
   receiving a revoke request sent by the grantor, wherein the revoke request comprises a second identifier, the second identifier is used to indicate a to-be-revoked capability, and the to-be-revoked capability is a capability granted by the grantor to the grantee; and
   deleting second target information that matches the second identifier from the capability node of the grantor, wherein the to-be-revoked capability is stored only in the capability node of the grantor, and the second target information is used to search all capabilities of the grantor for the to-be-revoked capability.

3. The capability management method according to claim 2, wherein the second identifier is further used to indicate a target grantee, and the target grantee is a different grantees; and the deleting second target information that matches the second identifier from the capability node of the grantor comprises:

deleting the second target information that matches the second identifier from the capability node of the grantor, wherein the second target information is further used to indicate the target grantee.

4. The capability management method according to claim 1, further comprising:

receiving a grant request sent by the grantor, wherein the grant request is used to indicate to grant a target capability in the capability node of the grantor, and the target capability is stored only in the capability node of the grantor;

recording grant information in the capability node of the grantor, wherein the grant information is used to indicate that the target capability has been granted; and recording granted information in the capability node of the grantee, wherein the granted information is used to search the capability node of the grantor for the target capability.

5. A computer device, wherein the computer device comprises a memory and a processor, the memory is configured to store computer-readable instructions, and the processor executes the instructions to:

receive a reject request sent by a grantee, wherein the reject request comprises a first identifier, the first identifier is used to indicate a to-be-rejected capability, and the to-be-rejected capability is a capability granted by a grantor to the grantee; and delete first target information that matches the first identifier from a capability node of the grantee, wherein the to-be-rejected capability is stored only in a capability node of the grantor, and the first target information is used to search the capability node of the grantor for the to-be-rejected capability.

6. The computer device according to claim 5, wherein the processor executes the instructions to:

receive a revoke request sent by the grantor, wherein the revoke request comprises a second identifier, the second identifier is used to indicate a to-be-revoked capability, and the to-be-revoked capability is a capability granted by the grantor to the grantee; and delete second target information that matches the second identifier from the capability node of the grantor, wherein the to-be-revoked capability is stored only in the capability node of the grantor, and the second target information is used to search all capabilities of the grantor for the to-be-revoked capability.

7. The computer device according to claim 6, wherein the second identifier is further used to indicate a target grantee, and the target grantee is a different grantees; and the processor executes the instructions to:

delete the second target information that matches the second identifier from the capability node of the grantor, wherein the second target information is further used to indicate the target grantee.

8. The computer device according to claim 5, wherein the processor executes the instructions to:

receive a grant request sent by the grantor, wherein the grant request is used to indicate to grant a target capability in the capability node of the grantor, and the target capability is stored only in the capability node of the grantor;

record grant information in the capability node of the grantor, wherein the grant information is used to indicate that the target capability has been granted; and record granted information in the capability node of the grantee, wherein the granted information is used to search the capability node of the grantor for the target capability.

9. A capability management method, comprising:

sending, by a grantor, a grant request to a kernel, wherein the grant request comprises a grant parameter, the grant parameter is used to indicate a to-be-granted capability, and the grant request is used to indicate the kernel to grant the to-be-granted capability to a grantee; and obtaining, by the grantor, a revoke parameter returned by the kernel, wherein the revoke parameter is used by the grantor to manage the current grant.

10. The capability management method according to claim 9, further comprising:

sending, by the grantor, a revoke request to the kernel, wherein the revoke request comprises the revoke parameter, and the revoke parameter is used by the kernel to perform capability revocation.

11. The capability management method according to claim 9, wherein the method further comprises:

sending, by the grantee, a prepare request to the kernel; and obtaining, by the grantee, a reject parameter returned by the kernel, wherein the reject parameter is used by the grantee to manage the granted capability.

12. The capability management method according to claim 11, further comprising:

sending, by the grantee, a reject request to the kernel, wherein the reject request comprises the reject parameter, and the reject parameter is used by the kernel to perform capability rejection.

* * * * *

UNITED STATES PATENT AND TRADEMARK OFFICE
CERTIFICATE OF CORRECTION

| | | |
|---|---|---|
| PATENT NO. | : 12,164,675 B2 | Page 1 of 1 |
| APPLICATION NO. | : 17/734187 | |
| DATED | : December 10, 2024 | |
| INVENTOR(S) | : Nan Wang et al. | |

It is certified that error appears in the above-identified patent and that said Letters Patent is hereby corrected as shown below:

In the Claims

Column 23, Claim 3, Line 5, please change from "grantees" to "grantee".

Column 24, Claim 7, Line 5, please change from "grantees" to "grantee".

Signed and Sealed this
Eleventh Day of March, 2025

Coke Morgan Stewart
*Acting Director of the United States Patent and Trademark Office*